(12) United States Patent
Kolhe et al.

(10) Patent No.: US 12,406,176 B2
(45) Date of Patent: Sep. 2, 2025

(54) DISTRIBUTED EXECUTION OF NEURAL NETWORKS

(71) Applicant: Hewlett Packard Enterprise Development LP, Houston, TX (US)

(72) Inventors: Jitendra Onkar Kolhe, Karnataka (IN); Soumitra Chatterjee, Karnataka (IN); Mohan Parthasarathy, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 1157 days.

(21) Appl. No.: 17/231,153

(22) Filed: Apr. 15, 2021

(65) Prior Publication Data
US 2022/0198249 A1  Jun. 23, 2022

(30) Foreign Application Priority Data
Dec. 18, 2020  (IN) .......................... 2020041055302

(51) Int. Cl.
*G06N 3/063*  (2023.01)
*G06N 3/10*  (2006.01)

(52) U.S. Cl.
CPC ............... *G06N 3/063* (2013.01); *G06N 3/10* (2013.01)

(58) Field of Classification Search
None
See application file for complete search history.

(56) References Cited

U.S. PATENT DOCUMENTS

| | | | |
|---|---|---|---|
| 7,426,578 B2 * | 9/2008 | Jones | H04L 67/1004 709/248 |
| 10,504,022 B2 | 12/2019 | Khaitan et al. | |
| 11,182,314 B1 * | 11/2021 | Borkovic | G06N 3/063 |
| 11,216,314 B2 * | 1/2022 | Harwood | G06F 9/4856 |
| 11,452,122 B1 * | 9/2022 | Macias | H04W 72/1263 |
| 2017/0273005 A1 * | 9/2017 | Daragon | H04W 40/246 |
| 2019/0050717 A1 * | 2/2019 | Temam | G06N 3/048 |
| 2019/0095796 A1 * | 3/2019 | Chen | G06N 3/045 |
| 2019/0114535 A1 | 4/2019 | Ng et al. | |
| 2019/0188570 A1 * | 6/2019 | Aldea Lopez | G06N 3/084 |
| 2020/0202215 A1 * | 6/2020 | Sadowski | G06N 3/063 |

(Continued)

FOREIGN PATENT DOCUMENTS

EP  3367310 A1  8/2018

OTHER PUBLICATIONS

Ankit et al., "PUMA: A Programmable Ultra-efficient Memristor-based Accelerator for Machine Learning Inference", ACM, Apr. 13-17, 2019, 17 pages.

(Continued)

*Primary Examiner* — Haimei Jiang
(74) *Attorney, Agent, or Firm* — Yao Legal Services, Inc.

(57) ABSTRACT

Example techniques for causing execution of neural networks are described. A neural network includes a first part and a second part. A determination is made that a first physical resource in a first computing device is to execute the first part and that a second physical resource in a second computing device is to execute the second part. The determination is based on a latency in communication between the first physical resource and the second physical resource. The first computing device and the second computing device are part of a cluster.

19 Claims, 8 Drawing Sheets

(56) References Cited

U.S. PATENT DOCUMENTS

2021/0295139 A1\* 9/2021 Kolhe .................... G06N 3/045
2022/0052961 A1\* 2/2022 Chauhan ................. H04L 47/82
2022/0116452 A1\* 4/2022 Rafey ............... G06F 18/24137

OTHER PUBLICATIONS

Avnet, "AI at the Edge: The next frontier of the Internet of Things", 2018, 10 pages.
HPE, "HPE Converged Edge Systems Video Analytics and Management Solution", Part No. P09283-002, Jun. 2019, 31 pages.
Qiao et al., "DLTAP: A Network-efficient Scheduling Method for Distributed Deep Learning Workload in Containerized Cluster Environment", ITM Web of Conferences 12, 03030, Sep. 5, 2017, 5 Pages.
Stack Exchange, "Shortest path with exactly k edges", available online at <https://cs.stackexchange.com/questions/11503/shortest-path-with-exactly-k-edges>, 2021, 2 pages.
Tomkins et al., "Google AI Blog", available online at <https://web.archive.org/web/20200802122231/https://ai.googleblog.com/2017/11/>, Nov. 30, 2017, 38 pages.
Zagoruyko et al., "Wide Residual Networks", 2016, 15 pages.

\* cited by examiner

| RESOURCE | FIRST PHYSICAL RESOURCE | SIXTH PHYSICAL RESOURCE | SEVENTH PHYSICAL RESOURCE | SECOND PHYSICAL RESOURCE | THIRD PHYSICAL RESOURCE |
|---|---|---|---|---|---|
| FIRST PHYSICAL RESOURCE | 0 | 10 | 20 | 30 | 50 |
| SIXTH PHYSICAL RESOURCE | 10 | 0 | 10 | 50 | 50 |
| SEVENTH PHYSICAL RESOURCE | 20 | 10 | 0 | 50 | 50 |
| SECOND PHYSICAL RESOURCE | 30 | 50 | 50 | 0 | 10 |
| THIRD PHYSICAL RESOURCE | 50 | 50 | 50 | 10 | 0 |

DISTRIBUTED EXECUTION OF NEURAL NETWORKS

BACKGROUND

Artificial neural networks, also referred to as neural networks, are simplified models of the way a human nervous system operates. A neural network may include several interconnected nodes arranged in a plurality of layers. Neural networks may be used to implement, for example, pattern recognition and predictive analytics in a variety of applications, such as speech recognition, machine translation, computer vision, and healthcare diagnostics.

BRIEF DESCRIPTION OF DRAWINGS

The following detailed description references the figures, wherein.

DETAILED DESCRIPTION

Figure 1:
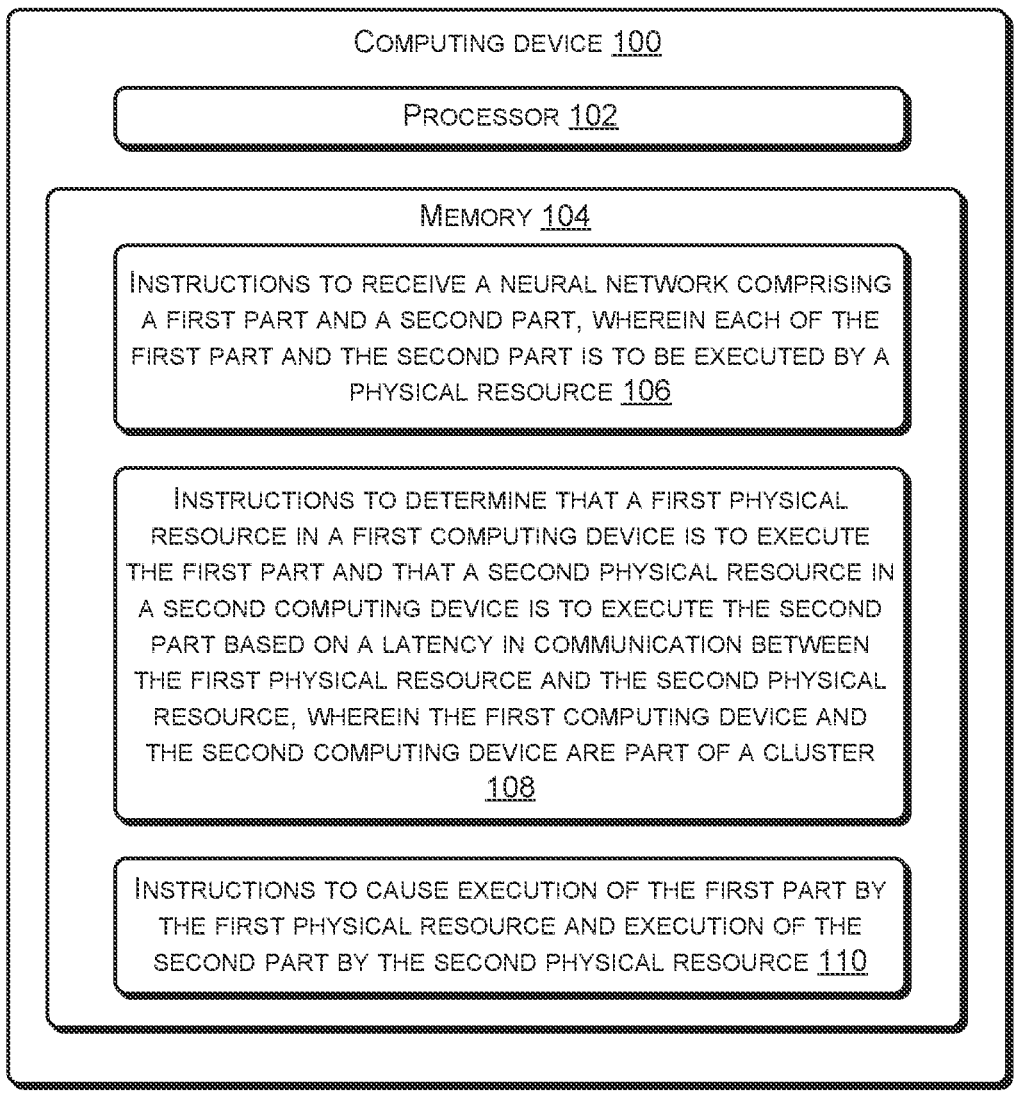
FIG. 1 illustrates a computing device for causing execution of neural networks, according to an example implementation of the present subject matter.

A neural network may include a plurality of instructions, such as instructions to perform matrix-vector multiplications, instructions to perform vector-vector additions, instructions to perform scalar-scalar additions, instructions to load data, instructions to store data, and the like. The instructions may be executed by a physical resource, such as a central processing unit (CPU), a graphics processing unit (GPU), or an accelerator device. An accelerator may refer to a specialized hardware that is capable of performing a particular function (in this case, execution of neural networks) more efficiently as compared to other types of computing architecture. An example accelerator is a dot-product engine (DPE), which includes a plurality of memristors and is capable of performing matrix-vector multiplication operations as dot product computations.

In some cases, the execution of a neural network, such as a neural network of a large size, may be a computationally-intensive task, and may not be performed as a whole by a single physical resource. In such cases, generally, the neural network may be executed in parts by the physical resource, causing an increase in the execution time of the neural network. This may be because the execution of the neural network in parts may involve repeated reconfiguration of data of the neural network, such as weights of the neural network, on the physical resource. For instance, initially, data corresponding to a first part is to be configured on the physical resource to allow execution of the first part. Upon execution of the first part, data corresponding to a second part is to be configured on the physical resource, so that the second part is executed. The reconfigurations also cause expenditure of computational resources.

The present subject matter relates to execution of neural networks. With the implementations of the present subject matter, a neural network may be executed on a plurality of physical resources. The physical resources may be distributed across computing devices of a cluster.

In accordance with an example implementation, a neural network may include a first part and a second part. The first part and the second part may be executed by different physical resources, hi an example, each part may include a set of instructions. Further, each of part may have associated data, such as weights and biases, on which the set of instructions are to operate. For instance, the first part may include instructions to perform matrix-vector multiplications using a weight that corresponds to the first part or instructions to perform vector-vector additions using a bias corresponding to the first part.

Data from execution of one part may be provided as an input to another part. For instance, the neural network may be a multilayer neural network and each part may include instructions corresponding to one layer in the neural network. The result from execution of one layer of the neural network may be transmitted to the next layer in the neural network. As another example, one part may include instructions to perform a matrix-vector multiplication and another part may include instructions to perform an addition of a vector generated from the matrix-vector multiplication with another vector.

A computing device may determine physical resources that are to execute the parts of the neural network. For example, the computing device may determine that a first physical resource in a first computing device is to execute the first part and that a second physical resource in a second computing device is to execute the second part. Upon the determination, the parts may be executed on the determined physical resources. In an example, the first computing device is same as the computing device that determines the physical resources that are to execute the parts.

The determination of the physical resources that are to execute the parts may be performed based on a latency in communication between the physical resources. For example, consider that the first physical resource, the second physical resource, and a third physical resource are available for execution of parts of a neural network. Consider also that the latency in communication between the first physical resource and the second physical resource is less than that between the first physical resource and the third physical resource and that between the second physical resource and the third physical resource. Accordingly, the first physical resource and the second physical resource may be selected for execution of the first part and the second part, respectively.

The latency in communication between the physical resources may depend on the communication link that connects the physical resources. The determination of the physical resources for execution of the parts based on the latency ensures that the data transfer that happens as part of execution of the neural network happens with minimal delay, thereby increasing the speed of execution of the neural network.

The first computing device and the second computing device may be part of a duster of computing devices, also referred to as a cluster. The computing devices of the cluster may share their respective physical resources for execution of parts of neural network. Accordingly, different parts of a single neural network may be executed in physical resources belonging to different computing devices.

In an example, each part of the neural network may have a corresponding logical identifier. Further, to cause execution of the neural network by a determined physical resource, the logical identifier in the neural network may be substituted with an identifier of the physical resource. In an example, a physical resource may be a dot-product engine (DPE) and the execution of a part may be performed by a tile of the DPE. Further, the identifier of the physical resource may be a physical address of a tile of the DPE that is to execute the part.

The formation of a cluster increases the number of physical resources that are available to execute a neural network. Therefore, speed of execution of a large-sized neural network, which may have several parts, may be significantly increased. For instance, the number of reconfigurations of data of the neural network, such as weights and biases, to be performed on the physical resources may be reduced, as the different parts may be assigned to different physical resources. The present subject matter can be utilized for execution of neural networks in a computing environment having multiple computing devices, where a particular computing device may not have physical resources sufficient for execution of all parts of a neural network.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a computing device 100 for causing execution of neural networks, according to an example implementation of the present subject matter. The computing device 100 may be implemented as, for example, a desktop computer, a laptop computer, or a server. The computing device 100 includes a processor 102 and a memory 104 coupled to the processor 102.

The processor 102 may be implemented as a microprocessor, a microcomputer, a microcontroller, a digital signal processor, a central processing unit, a state machine, a logic circuitry, and/or any device that can manipulate signals based on operational instructions. Among other capabilities, the processor 102 may fetch and execute computer-readable instructions included in the memory 104. The computer-readable instructions may include instructions 106-110. The functions of the processor 102 may be provided through the use of dedicated hardware as well as hardware capable of executing machine-readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the computing device 100 may also include interface(s) and system data (not shown in FIG. 1). The interface(s) may include a variety of instructions-based interfaces and hardware interfaces that allow interaction with a user and with other communication and computing devices, such as network entities, web servers, external repositories, and peripheral devices. The system data may serve as a repository for storing data that may be fetched, processed, received, or created by the instructions.

In operation, the instructions 106 are executable to receive a neural network including a first set of instructions and a second set of instructions. The first set of instructions and the second set of instructions may be interchangeably referred to as a first part and a second part respectively. The instructions may include, for example, instructions to perform matrix-vector multiplications, instructions to perform vector-vector additions, and instructions to load, store, send, and/or receive data. In an example, output of execution of the first part may have to be fed as input to the second part. For instance, the first part may include instructions corresponding to one layer of the neural network and the second part may include instructions corresponding to the next layer of the neural network. As another example, the first part may include instructions to perform a matrix-vector multiplication and the second part may include instructions to perform an addition of a vector generated from the matrix-vector multiplication with another vector. The instructions in the neural network may also be referred to as neural network instructions.

The instructions 108 are executable to determine physical resources that are to execute the parts of the neural network. For example, it may be determined that a first physical resource in a first computing device (not shown in FIG. 1) is to execute the first part and that a second physical resource in a second computing device (not shown in FIG. 1) is to execute the second part. The first computing device and the second computing device may be part of a cluster of computing devices, also referred to as a cluster. Each computing device of the cluster may have one or more physical resources. Further, physical resources from multiple computing devices may be utilized in execution of a neural network.

The determination of the physical resources to execute the parts may be performed based on a latency in communication between the first physical resource and the second physical resource. For instance, of multiple physical resources that are available for execution of parts, the communication between the first physical resource and the second physical resource may have the least latency. The latency in communication between the physical resources may depend on the communication link that connects the physical resources. In an example, to determine the latency in communication between two physical resources, the computing device 100 may utilize cluster latency information (not shown in FIG. 1), which may indicate the latencies in communication between physical resources of the cluster.

Upon the determination, the instructions 110 may cause execution of the first part by the first physical resource and the second part by the second physical resource. For instance, instructions of the first part and of the second part may be transmitted to the first physical resource and the second physical resource, respectively, for being executed. The execution of a neural network may be performed for training of the neural network or for inferencing of the neural network.

Figure 2:
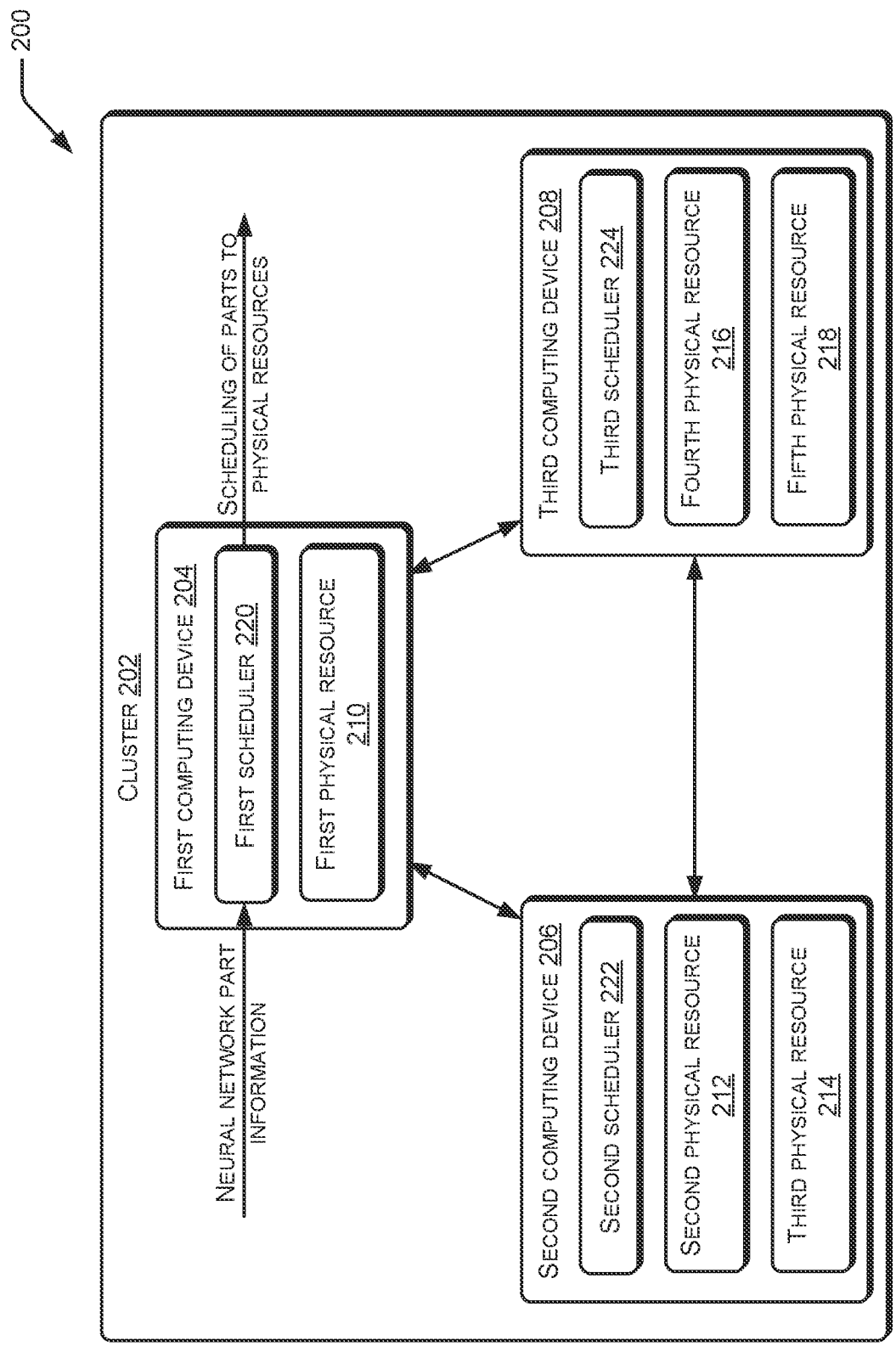
FIG. 2 illustrates a computing environment that includes a plurality of computing devices that are to execute a neural network, according to an example implementation of the present subject matter.

FIG. 2 illustrates a computing environment 200 that includes a plurality of computing devices that are to execute a neural network, according to an example implementation of the present subject matter. In an example, the computing devices of the computing environment 200 may be converged infrastructure devices, in which compute, storage, and networking are integrated. Further, in an example, the computing devices may be geographically proximate to each other. For instance, the computing environment 200 may be an industrial plant, a factory, an offshore drilling rig, or the like.

The computing devices may have to perform various functions for which a neural network has to be executed. The functions may be, for example, asset tracking, speech recognition, surveillance, and the like. To execute the neural networks, each computing device may include a physical resource. The physical resource may be an accelerator, which may refer to a hardware component that is specialized in the execution of neural networks or parts thereof. In an example, a physical resource may be a dot-product engine (DPE). A physical resource may be accommodated, for example, in a Peripheral Component Interconnect (PCI) slot of a computing device.

While each computing device may have physical resource(s), the number of physical resources in one computing device may not be sufficient to execute a large-sized neural network, which may have several parts. The number of physical resources in the computing device may be small due to various reasons, such as unavailability of PCI slots in the computing device, cost saving, and power saving. To facilitate execution of large-sized neural networks, a cluster 202 having multiple computing devices of the computing environment 200 may be formed. Accordingly, physical resources of multiple computing devices of the cluster 202 may be utilized to execute the neural network. For example, the cluster 202 may include a first computing device 204, a second computing device 206, and a third computing device 208. Further, the first computing device 204 may include a first physical resource 210, the second computing device 206 may include a second physical resource 212 and a third physical resource 214, and the third computing device 208 may include a fourth physical resource 216 and a fifth physical resource 218. Thus, parts of the neural network may be executed in one or more of the physical resources 210-218.

The present subject matter provides techniques for determination of physical resources of the cluster 202 that are to be used for execution of parts of a neural network. The determination of the physical resources to execute the parts of the neural network may be referred to as scheduling the parts of the neural network. In an example, the scheduling may be performed by one computing device of the cluster 202, such as the first computing device 204. Accordingly, the first computing device 204 corresponds to the computing device 100. In an example, the scheduling may be performed by a computing device that receives a command to execute the neural network.

The scheduling may be performed by a first scheduler 220 that is part of the first computing device 204. In an example, the first scheduler 220 may be implemented by a processor of the first computing device 204 by executing a set of instructions (not shown in FIG. 2). Similar to the first scheduler 220, a second scheduler 222 and a third scheduler 224 may be implemented in the second computing device 206 and the third computing device 208, respectively.

To perform the scheduling, the first scheduler 220 may receive information regarding the neural network, such as number of parts in the neural network and the sequence in which the various parts are to be executed, and may schedule the different parts for execution. For example, the first scheduler 220 may assign the first part for execution by the first physical resource 210 and the second part for execution by the second physical resource 212. The scheduling may be based on latencies in communications between the various physical resources, as will be explained below.

Although not shown, the various computing devices of the cluster 202 may communicate with each other over a communication network, which may be a wireless or a wired network, or a combination thereof. The communication network may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network may include various network entities, such as transceivers, gateways, and routers.

Figure 3:
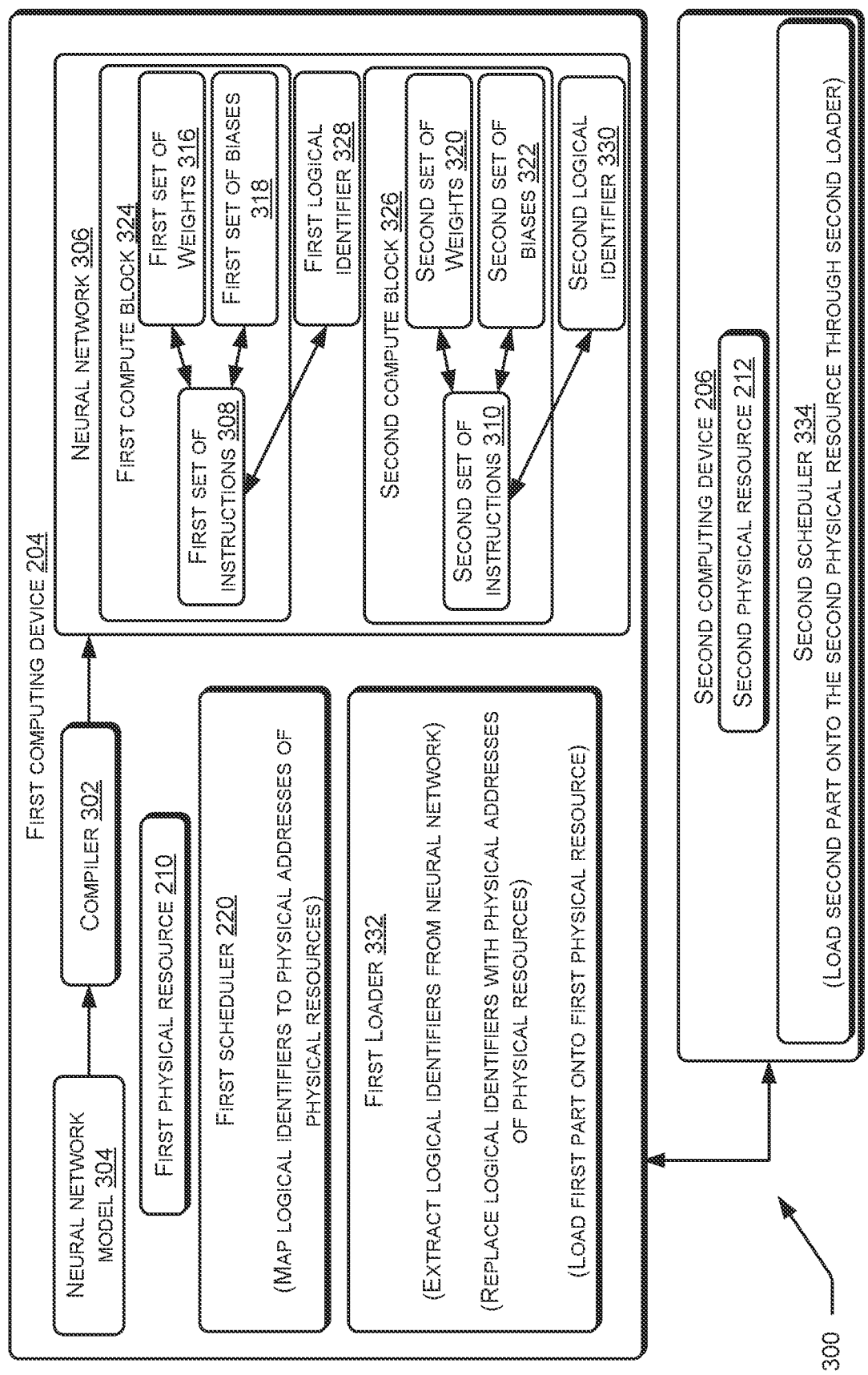
FIG. 3 illustrates a computing environment implementing scheduling of parts of neural network for execution of a neural network, according to an example implementation of the present subject matter.

FIG. 3 illustrates a computing environment 300 implementing scheduling of parts of neural network for execution of the neural network, according to an example implementation of the present subject matter. The computing environment 300 may correspond to the computing environment 200. The computing environment 300 may include the first computing device 204 and the second computing device 206, which form part of the cluster 202 (not shown in FIG. 3).

The first computing device 204 may include a compiler 302 that may compile a neural network model 304 to generate a neural network 306. The neural network model 304 may be programmed in a high-level programming language, such as C++ or python. The neural network model 304 may be compiled so that the generated neural network 306 is in a machine-readable form and can be executed by physical resources. In an example, the compiler 302 may be implemented by a processor of the first computing device 204 by executing a set of instructions (not shown in FIG. 3).

In an example, the neural network 306 may include parameters, also referred to as neural network parameters, which include weights and biases. A weight of a neural network may be assigned to a connection between a first node and a second node of the neural network, where each node represents an artificial neuron of the neural network. The weight represents a strength of the connection between the nodes. For instance, an output of the first node is multiplied by the weight of the connection between the first node and the second node, and the product is used for obtaining the output of the second node. In an example, the weight may be represented in the form of a matrix and the output of the first node may be represented in the form of a vector. Accordingly, the multiplication of the weight and the output of the first node may be performed through matrix-vector multiplication (MVM). A bias may refer to an additional parameter that is added to the product of the weight and the output of the first node. The bias may be used to adjust the value output by the second node. In an example, the bias may be represented in the form of a vector. Accordingly, the sum of the product of the MVM and the bias may be a vector-vector addition.

The neural network 306 may also include a plurality of parts, such as a first part 308 (also referred to as a first set of instructions 308) and a second part 310 (also referred to as a second set of instructions 310). The sets of instructions 308 and 310 are to be executed to execute the neural network 306. For example, a set of instructions may include instructions to perform an MVM operation which is to be performed to compute a product of a weight matrix and an output vector from a node, and instructions to perform vector-vector addition which is to be performed to compute a sum of the product of the MVM and a bias. A set of instructions may also include instructions to perform scalar-scalar addition, instructions to perform scalar-scalar multiplication, and instructions to load data, store data, send data, and receive data.

A part of the neural network 306 may be associated with a set of weights, a set of biases, or both. Further, the instructions of the part may operate on the corresponding weights and/or biases. For instance, the first set of instructions 308 may be associated with a first set of weights 316 and a first set of biases 318. Accordingly, the first set of instructions 308 may perform MVMs involving the first set of weights 316 and vector-vector additions involving the first set of biases 318. Similarly, the second set of instructions 310 may be associated with a second set of weights 320 and a second set of biases 322, and the second set of instructions 310 may perform MVMs involving the second set of weights 320 and vector-vector additions involving the second set of biases 322. In an example, the second set of instructions 310 may receive an input generated based on execution of the first set of instructions 308. For instance, an output generated from a first MVM performed as a result of execution of the first set of instructions 308 may act as an input for performing a second MVM that is to be performed by executing the second set of instructions 310.

A set of instructions and the corresponding weights and biases may be collectively referred to as compute block. For instance, a first compute block 324 may include the first set of instructions 308, the first set of weights 316, and the first set of biases 318 and a second compute block 326 may include the second set of instructions 310, the second set of weights 320, and the second set of biases 322.

In an example, the compiler 302 may generate the neural network 306 such that each part of the neural network 306 may be executed by one of the physical resources at any given point in time. Further, the neural network 306 may include a logical identifier corresponding to each part, such as a first logical identifier 328 corresponding to the first part 308 and a second logical identifier 330 corresponding to the second part 310, to indicate that the corresponding part is to be assigned to one physical resource for execution. The logical identifier may be replaced with the identifier of the physical resource that is to execute the corresponding part. The identifier of the physical resource may be, for example, a physical address of the physical resource. Further, in an example, the generation of the neural network 306 may be such that each part may be executed by a computational unit belonging to a physical resource. The computational unit may be, for example, a the of a DPE. Further, the logical identifier may indicate that the corresponding part is to be assigned to one computational unit for execution. The logical identifier may be replaced with the identifier of the computational unit that is to execute the corresponding part. Thus, the logical identifier may act as a placeholder for the identifier of a physical resource or the identifier of the computational unit, as the case may be.

The scheduling of the parts will be explained. In an example, the scheduling of the parts of a neural network may be performed by the scheduler of the computing device that received an instruction to execute the neural network, such as from a user. For instance, if an instruction to execute the neural network 306 is received by the first computing device 204, the scheduling of the parts of the neural network 306 may be performed by the first scheduler 220. To perform the scheduling, first, the logical identifiers in the neural network 306 may be extracted. The extraction may be performed by a first loader 332 of the first computing device 204. The first loader 332 may perform the extraction, for example, by parsing the neural network 306. The first loader 332 may be implemented by the processor of the first computing device 204 by executing a set of instructions (not shown in FIG. 3). The first loader 332 may provide the extracted logical identifiers to the first scheduler 220.

Upon receiving the logical identifiers, the first scheduler 220 may determine the physical resources to which the parts corresponding to the logical identifiers are to be assigned for execution. The first scheduler 220 may determine the physical resources based on latencies in communication between the physical resources in the cluster 202. The latencies may be considered for the determination because the execution of the neural network 306 involves flow of data (e.g., output of execution of a part of the neural network 306) between the various parts of the neural network 306. Accordingly, data flows between physical resources when executing the parts. The determination of the physical resources based on the latencies ensures that the delay in communication of data between physical resources is minimized, thereby improving the speed of execution of the neural network. To determine the latency in communication between the various physical resources of the duster 202, duster latency information may be utilized, as will be explained with reference to FIG. 5.

In Ag. 3, a scenario is illustrated in which the first physical resource 210 is selected for execution of the first part 308 and the second physical resource 212 is selected for execution of the second part 310. In response to such a selection, in an example, the first scheduler 220 may map the first logical identifier 328 to the identifier of the first physical resource 210 and map the second logical identifier 330 to the identifier of the second physical resource 212. If each logical identifier is to correspond to a computational unit, the first scheduler 220 may map the first logical identifier 328 to the identifier of a computational unit of the first physical resource 210 and map the second logical identifier 330 to the identifier of a computational unit of the second physical resource 212. Further, the mappings may be provided to the first loader 332.

Upon receiving the mappings, the first loader 332 may replace the first logical identifier 328 in the neural network 306 with the identifier of the first physical resource 210 (or with the identifier of the computational unit of the first physical resource 210) and replace the second logical identifier 330 in the neural network 306 with the identifier of the second physical resource 212 (or with the identifier of the computational unit of the second physical resource 212). Thus, all references to logical identifiers in the neural network 306 may be replaced with the identifiers of the physical resources (or computational units) with which the identifiers were mapped by the first scheduler 220. As mentioned earlier, an identifier of a physical resource/ computational unit may be a physical address of the physical resource/computational unit. In addition, the first loader 332 may load a compute block (which includes a part of the neural network 306 and its associated neural network parameters) onto a physical resource to which the part is assigned. The first loader 332 may perform such a loading function onto those physical resources that are present in the first computing device 204. For example, of the physical resources selected, the first physical resource 210 is present in the first computing device 204. Accordingly, the first loader 332 may load the first compute block 324 onto the first physical resource 210. To load the second compute block 326 onto the second physical resource 212, in an example, the first scheduler 220 may provide the second compute block 326 to a second scheduler 334, which is present in the second computing device 206. The second scheduler 334 may then load the second compute block 326 onto the second physical resource 212 through a second loader (not shown in FIG. 3) of the second computing device 206.

In an example, the first scheduler 220 may designate one of the selected physical resources as a conductor resource and the other selected physical resources as member resources. The conductor resource may be responsible for execution of one part of the neural network 306. In addition, the conductor resource may be responsible for receiving the final output of execution of the neural network 306, such as from the physical resource that executes the final part of the neural network, and for outputting the final output. In an example, the first scheduler 220 may designate a physical resource that is part of the first computing device 204 (which received the instruction to execute the neural network 306) as the conductor resource. For example, if the first physical resource 210 and the second physical resource 212 are selected for execution of the neural network 306, the first scheduler 220 may designate the first physical resource 210 as the conductor resource. Such a designation may allow the first computing device 204, which received the instruction to execute the neural network 306, to provide the output of execution of the neural network 306. In an example, if the first computing device 204 does not have an available physical resource for execution of a part (e.g., if the first physical resource 210 is busy executing a part of another neural network), the first scheduler 220 may output an error indicating that the execution of the neural network 306 cannot be initiated and managed by the first computing device 204. In such a case, the user may provide the instruction to execute the neural network 306 to another computing device, such as the second computing device 206, or may provide the instruction to the first computing device 204 at a later point of time.

Although the first computing device 204 and the second computing device 206 are each shown as having one physical resource, the computing devices may have more than one physical resource. Further, the physical resources may be connected among themselves through various communication links.

Figures 4, 5:
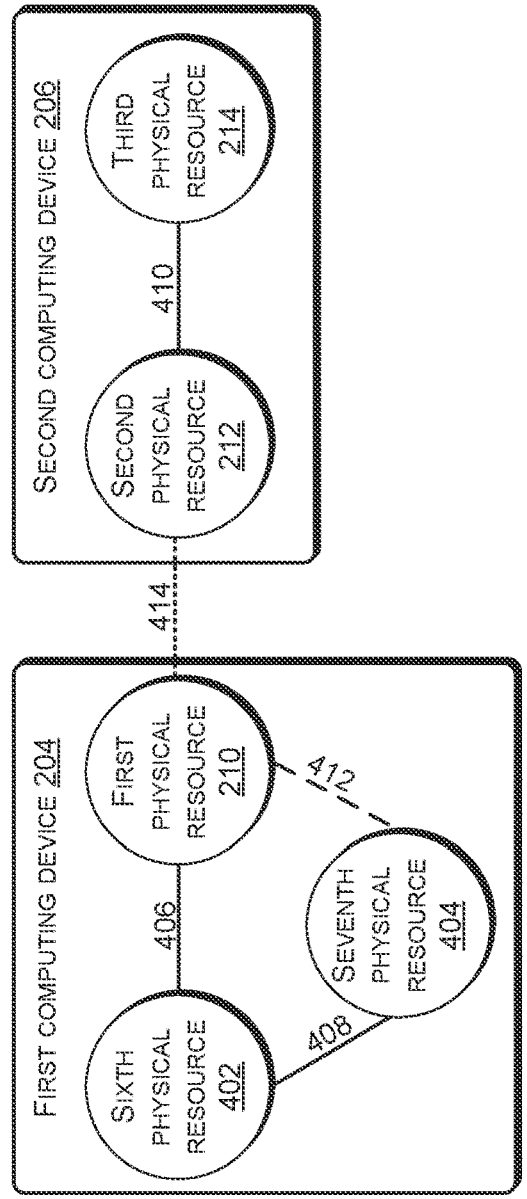
FIG. 4 illustrates the connections among physical resources of a first computing device and a second computing device, according to an example implementation of the present subject matter.
FIG. 5 illustrates a cluster latency table providing information of latency between physical resources of computing devices, according to an example implementation of the present subject matter.

FIG. 4 illustrates the connections among the physical resources of the first computing device 204 and the second computing device 206, according to an example implementation of the present subject matter. As illustrated, in addition to the first physical resource 210, the first computing device 204 may include a sixth physical resource 402 and a seventh physical resource 404, Further, the second computing device 206 may include the third physical resource 214, in addition to the second physical resource 212.

The physical resources in a computing device may be connected with each other through any of a variety of communication links. For example, a first communication link 406 connecting the first physical resource 210 and the sixth physical resource 402, a second communication link 408 connecting the sixth physical resource 402 and the seventh physical resource 404, and a third communication link 410 connecting the second physical resource 212 and the third physical resource 214 may be of a first type. Further, a fourth communication link 412 connecting the first physical resource 210 and the seventh physical resource 404 may be of a second type. Further, physical resources of different computing devices may also be connected through a communication link. For instance, a fifth communication link 414 may connect the first physical resource 210 and the second physical resource 212. The fifth communication link 414 may be of a third type. The fifth communication link 414 may be a dedicated connection between the first physical resource 210 and the second physical resource 212 and may be different than a communication link, such as an ethernet connection, between the first computing device 204 and the second computing device 206. In an example, the communication between physical resources on different computing devices may not happen over the communication link connecting the computing devices, and may happen over the dedicated communication link connecting the physical resources.

A speed of one type of communication link may be higher than that of another type of communication link. For example, the first type of communication link may have a higher speed (and therefore, a lower latency) as compared to the second type of communication link and the second type of communication link may have a higher speed as compared to the third type of communication link. The various types of communication link may include an Infiniband link and a PCI Express (PCIe) link. In an example, two physical resources may be connected by more than one communication link, each of a different type. For instance, in addition to the first communication link 406, such as an Infiniband link, another communication link (not shown in FIG. 4) that is of the second type, such as a PCIe link, may connect the first physical resource 210 and the sixth physical resource 402.

In an example, any two physical resources within a computing device may be directly connected to each other, i.e., such that there is no third physical resource in a connection between the two physical resources. For instance, as illustrated, the seventh physical resource 404 is directly connected to both the remaining physical resources in the first computing device 204, However, some physical resources in different computing devices may not be connected to each other directly. For instance, as illustrated, the third physical resource 214 is indirectly connected to the first physical resource 210, through the second physical resource 212. Similarly, the second physical resource 212 is connected to the sixth physical resource 402 and the seventh physical resource 404 indirectly, through the first physical resource 210. The communication between two indirectly-connected physical resources may happen through an intermediate physical resource that connects the indirectly-connected physical resources. The indirect connection between two physical resources may increase the latency in communication between the physical resources due to the involvement of the intermediate physical resource in the communication.

The latency in communication between two physical resources may be considered by the first scheduler 220 for scheduling parts of the neural network 306 to the physical resources. For instance, the first scheduler 220 may not assign the first part 308 and the second part 310 for execution to the seventh physical resource 404 and the third physical resource 214 respectively, as the high latency that would be involved in communication of data between the seventh physical resource 404 and the third physical resource 214 may reduce the speed of execution of the neural network 306. To schedule the parts of the neural network based on the latency, the first scheduler 220 may utilize cluster latency information, as will be explained below.

FIG. 5 illustrates a cluster latency table 500 providing information of latency between physical resources of computing devices, according to an example implementation of the present subject matter. The cluster latency table 500 may also be referred to as the latency table 500. The information provided by the latency table 500 may be referred to as cluster latency information. For the sake of simplicity, the latency table 500 is shown in a case where the cluster 202 has two computing devices (the first and the second computing devices 204 and 206) and where the physical resources of the first computing device 204 and the physical resources of the second computing device 206 are connected in the manner as illustrated in FIG. 4. However, it will be understood that the latency table 500 may be adapted for any number of computing devices and any manner of connections between the physical resources.

The latency table 500 may provide information of latency in communication between each physical resource of the cluster 202 and each remaining physical resource of the cluster 202. For example, the latency table 500 indicates the latency between the first physical resource 210 and each remaining physical resource in the cluster 202, i.e., the second physical resource 212, the third physical resource 214, the sixth physical resource 402, and the seventh physical resource 404. The latency in communication between two physical resources may depend on the type of communication link between them. Accordingly, the latency values in the latency table 500 may be higher for a slower communication link. For instance, the latency value for the first communication link 406 (between the first physical resource 210 and the sixth physical resource 402) ('10') may be less than that for the fifth communication link 414 (between the first physical resource 210 and the second physical resource 212) ('30'). In an example, a ratio of two latency values may provide a measure of the slowness of one communication link as compared to another. For instance, a latency value of 10 for the first communication link 406 and a latency value of 30 for the fifth communication link 414 may indicate that the first communication link 406 is thrice as fast as the fifth communication link 414. In some cases, two physical resources may be connected by more than one communication link, each of a different type. In such cases, the latency value indicated in the table may be that corresponding to the higher-speed communication link. For example, even if the first physical resource 210 and the sixth physical resource 402 are connected to each other by communication links of the first type and the second type, the latency value indicated in the latency table 500 may be that of the first type.

In an example, the latency value assigned to an indirect connection, such as the connection between the first physical resource 210 and the third physical resource 214, may be an arbitrary value. Such a value may be higher than the latency values assigned for direct communication links (e.g., the fifth communication link 414 and the third communication link 410), to indicate that the communication between the two concerned devices is likely to be slower than that between two directly-connected devices. In an example, the arbitrary value may be 50.

The latency table 500 may be generated, for example, by the first computing device 204, such as by the first scheduler 220 of the first computing device 204. To generate the latency table 500, the first computing device 204 may determine the communication links between the physical resources of the first computing device 204 and accordingly populate the latency values. In an example, the determination of the links between the physical resources may be performed by the first loader 332. Further, the first loader 332 may provide the result of the determination to the first scheduler 220. Further, the first computing device 204 may query the second computing device 206 for the various physical resources in the second computing device 206 and the latency in communication between the physical resources or the communication links between those physical resources, and accordingly populate latency values. The information of the physical resources in the second computing device 206 and the communication links between those physical resources may be provided, for example, by the second scheduler 334. Further, the first computing device 204 may determine the communication links existing between physical resources of the first computing device 204 and physical resources of the second computing device 206 and accordingly populate latency values in the latency table 500.

In an example, when the third computing device 208 (not shown in FIG. 5), is to join the cluster 202, the third computing device 208 may send a request for joining to the first computing device 204. Upon receiving the request, the first computing device 204 may receive information of the physical resources in the third computing device 208 and the connections between those physical resources and update the latency table 500 accordingly. The information of the connections may be, for example, the information of communication links between the physical resources or the information of latency in communication between the physical resources. The first computing device 204 may also determine the connections between the physical resources of the first computing device 204 and that of the third computing device 208 and determine the connections between the physical resources of the second computing device 206 and that of the third computing device 208 and accordingly update the latency table 500. The updated latency table may also be shared with the second computing device 206 and the third computing device 208, so that all computing devices of the cluster 202 may have the latest information regarding the computing devices in the cluster 202, their respective physical resources, and the latencies that would be involved in communication between any two physical resources of the cluster 202.

In another example, upon receiving a request to join from the third computing device 208, the second computing device 206 may update the latency table 500 independently of the first computing device 204. The information of the physical resources in the cluster 202 and the connections between the physical resources may be referred to as cluster topology information.

The first scheduler 220 may utilize the latency table 500 to schedule the parts of the neural network 306. To perform the scheduling, the first scheduler 220 may first determine the physical resources of the cluster 202 that are available for execution of neural network parts, such as the physical resources that are not occupied with execution of parts of other neural networks. The first scheduler 220 may also receive the information of the number of parts in the neural network 306.

In an example, to perform the scheduling, the first scheduler 220 may initially perform a tentative scheduling, according to which the first scheduler 220 tentatively assigns the parts to any of the available physical resources and may compute the total latency that would be involved in communication of data among the assigned physical resources for execution of the neural network 306. For example, consider that all physical resources of the cluster 202 are available for execution of parts of the neural network 306 and that the neural network 306 includes the first part 308, the second part 310, and a third part (not shown in FIG. 5). Consider also that output from execution of the first part 308 is to be provided to the second part 310 and that output from execution of the second part 310 is to be provided to the third part. Further, consider that output from execution of the third part is the final output and is therefore to be provided to the physical resource that would act as the conductor resource, for being shared as the output of execution of the neural network 306. In such a case, the first scheduler 220 may tentatively assign the executions of the first part 308 to the first physical resource 210, the second part 310 to the second physical resource 212, and the third part to the third physical resource 214. The first scheduler 220 may also tentatively designate the first physical resource 210 as the conductor resource. Accordingly, the total latency value may be computed as a sum of (i) a latency value involved in communicating between the first physical resource 210 and the second physical resource 212 (for communicating output from execution of the first part 308 to the second part 310), (ii) a latency value involved in communicating between the second physical resource 212 and the third physical resource 214 (for communicating output from execution of the second part 310 to the third part), and (iii) a latency value involved in communicating between the third physical resource 214 and the first physical resource 210 (for communicating output from execution of the third part to the conductor resource). Thus, the total latency value for such an assignment is 90 (30+10+50). In this manner, the first scheduler 220 may determine the latency values for various tentative assignments of physical resources and various tentative designations of conductor resources.

Subsequently, the first scheduler 220 may select the tentative assignment and tentative designation that involves the least latency value for scheduling the parts of the neural network 306. For instance, first scheduler 220 may assign the first part 308 to the first physical resource 210, the second part 310 to the sixth physical resource 402, and the third part to the seventh physical resource 404 and may designate the first physical resource 210 as the conductor resource, since such an assignment provides the least total latency value (10+10+20=40).

In an example, the tentative assignment for one part may depend on the physical resource to which the previous part is tentatively assigned. For instance, the physical resource to which a particular part is tentatively assigned may be the one having the least latency for communication with the physical resource to which the previous part is tentatively assigned. This will be explained with the help of an example. Consider that the first part 308 is tentatively assigned to the first physical resource 210. Accordingly, the second part 310 may be tentatively assigned to the sixth physical resource 402, as among the remaining available physical resources, the sixth physical resource 402 has the least latency for communication with the first physical resource 210. Similarly, the third part may be tentatively assigned to the seventh physical resource 404, as among the remaining available physical resources, the seventh physical resource 404 has the least latency in communication with the sixth physical resource 402.

In both the above examples, the first scheduler 220 may assign the parts to the physical resources such that the latency that would be caused due to communication of data among parts of the neural network 306 is as small as possible. Thus, the present subject matter achieves a quick execution of the neural network 306.

In an example, the parts of the neural network 306 may be assigned to computational units in the physical resources. Further, the parts may have to be assigned to physical resources that are indirectly connected to each other due to unavailability of directly-connected physical resources. The scheduling in such scenarios will be explained with reference to FIG. 6. Although in FIG. 5, the cluster latency information is expressed in the form of a table, in other examples the information may be expressed in other forms, such as in the form of a weighted graph.

Figure 6:
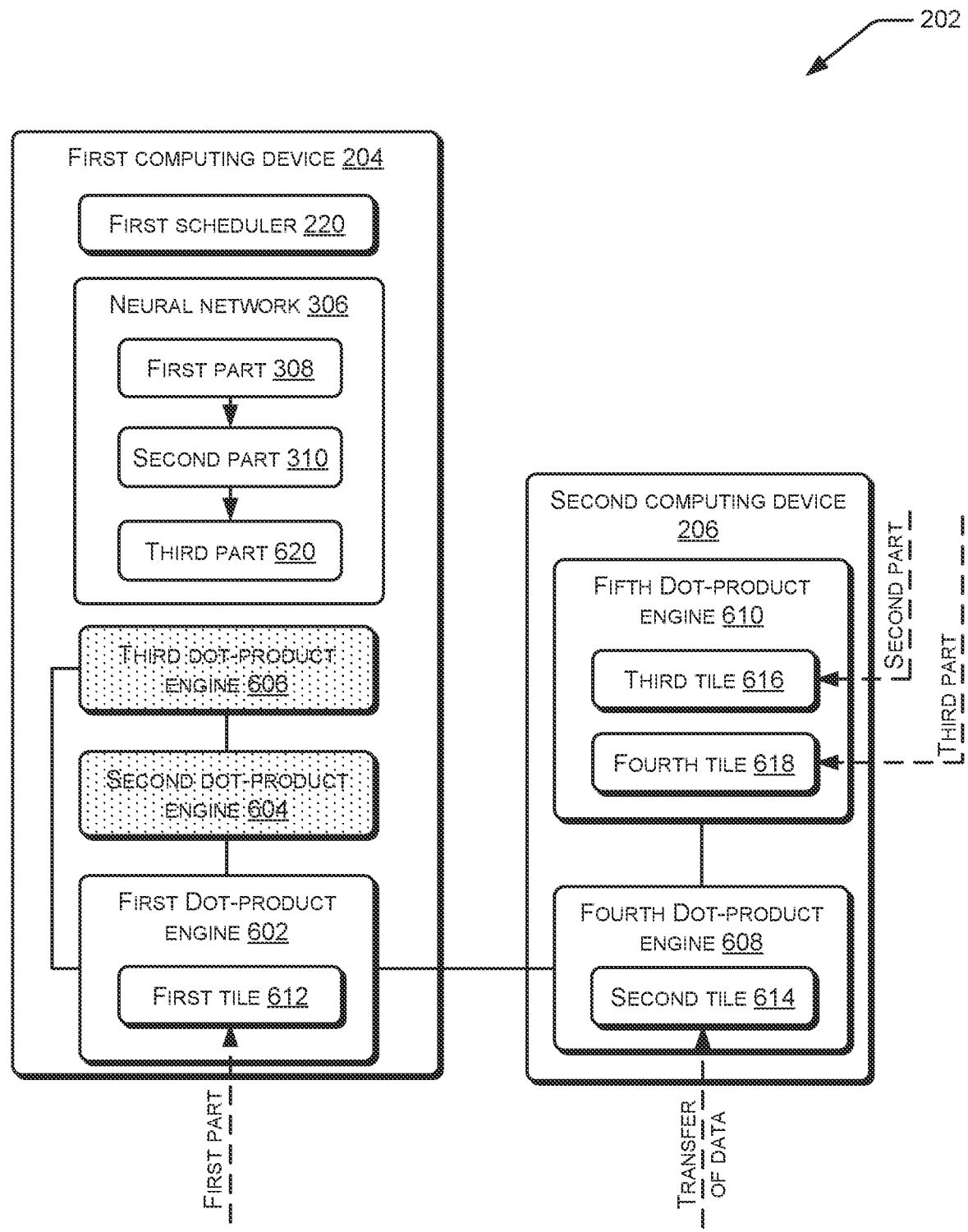
FIG. 6 illustrates a cluster having a first computing device and a second computing device, according to an example implementation of the present subject matter.

FIG. 6 illustrates the cluster 202 having the first computing device 204 and the second computing device 206, according to an example implementation of the present subject matter. In an example, the physical resources in the computing devices may be DPEs. For example, the first computing device 204 includes a first DPE 602, a second DPE 604, and a third DPE 606, which correspond to the first physical resource 210, the sixth physical resource 402, and the seventh physical resource 404 respectively. Similarly, the second computing device 206 may include a fourth DPE 608 and a fifth DPE 610, which correspond to the second physical resource 212 and the third physical resource 214 respectively. A DPE may perform a MVM operation as a dot-product computation. A DPE may include one or more computation units, which are also referred to as tiles. For example, the first DPE 602 may include a first tile 612, the fourth DPE 608 may include a second tile 614, and the fifth DPE 610 may include a third tile 616 and a fourth tile 618. Similarly, the second DPE 604 and the third DPE 606 may each include one or more tiles (not shown in FIG. 6).

In an example, each tile may include a memory and a plurality of cores (not shown in FIG. 6). The memory may be loaded with the instructions that are to be executed by the tile. A core may include a plurality of MVM units, which can perform MVM operations involved in execution of a neural network. In an example, a MVM unit may be programmed with a matrix, such as a weight matrix, that is involved in a MVM operation. Further, the MVM unit may receive the vector that is to be multiplied with the matrix as an input and perform the MVM operation. In an example, in addition to the MVM units, each core may include units that can perform other operations, such as vector-vector addition operation, scalar-scalar addition operation, and matrix-matrix addition, that are involved in execution of a neural network.

The DPEs of the cluster 202 may be connected in various ways. For example, as illustrated, the first DPE 602, the second DPE 604, and the third DPE 606 may be directly connected between each other. Similarly, the fourth DPE 608 and the fifth DPE 610 may be directly connected to each other. However, the fifth DPE 610 may be indirectly connected to the first DPE 602 through the fourth DPE 608.

The neural network 306 may include the first part 308, the second part 310, and a third part 620. In an example, an output of execution of the first part 308 is to be provided as an input to the second part 310. Similarly, an output of execution of the second part 310 may have to be provided as an input to the third part 620. The third part 620 may be the final part of the neural network 306. Accordingly, the output from execution of the third part 620 may have to be provided to the DPE that executes the first part 308, for providing the output of execution of the neural network 306. A part that is to receive an output of execution of another part and a part that is to provide its output to another part may be referred to as being related to the other part. Accordingly, the first part 308, the second part 310, and the third part 620 are related to each other.

The first scheduler 220 may assign the various parts of the neural network 306 to the tiles of the DPEs in the cluster 202 based on availability of tiles and based on latency in communication between the DPEs. In an example, the first scheduler 220 may attempt to schedule the parts such that a part that is to receive the output of execution of another part is assigned to the same DPE as the other part or to a DPE that is directly connected to the DPE to which the other part is assigned. For example, the first scheduler 220 may attempt to assign both the first part 308 and the second part 310 to the same DPE (i.e., to different tiles of the same DPE). If such an assignment is not possible, the first scheduler 220 may attempt to assign the first part 308 and the second part 310 to DPEs that are directly connected to each other, such as the first DPE 602 and the second DPE 604. The first scheduler 220 may attempt to perform such an assignment because assignment of related parts, such as the first part 308 and the second part 310, to indirectly-connected DPEs increases latency in communication of data from one part to another, as explained above. Further, the first scheduler 220 may attempt to schedule such that the DPE to which the final part of a neural network is assigned is same as or is directly connected to the DPE to which the first part of the neural network is assigned. For instance, the first scheduler 220 may attempt to assign the first part 308 and the third part 620 to the same DPE. If such an assignment is not possible, the first scheduler 220 may attempt to assign the first part 308 and the third part 620 to directly-connected DPEs. Such an assignment may be attempted because, the DPE to which the first part of the neural network is assigned is to be the conductor resource and is to receive output from execution of the final part, so that the conductor resource can generate the output of execution of the neural network. However, in some cases, the above-explained attempts may fail. One such case is explained below.

Consider that tiles of the second DPE 604 and of the third DPE 606 are unavailable for execution of parts of the neural network 306, such as due to execution of parts of another neural network. Consider also that the first DPE 602 has a single tile, i.e., the first tile 612, or that other tiles (not shown in FIG. 6) of the first DPE 602 are unavailable. In such a case, the tiles of the cluster 202 that are available for execution may be the first tile 612 and second through fourth tiles 614-618. Accordingly, the three parts of the neural network 306 are to be assigned among the four tiles. Further, the first part 308 is to be assigned to the first tile 612, as the first DPE 602 is to be the conductor resource (because the conductor resource is to be part of the computing device that received the instruction to execute the neural network 306, i.e., the first computing device 204, and the first DPE 602 is the only available DPE in the first computing device 204) and the first tile 612 is the only (or only available) tile in the first DPE 602. Thus, the remaining two parts are to be assigned among the second through fourth tiles 614-618. Thus, at least one part of the neural network 306 is to be assigned to the fifth DPE 610, and such an assignment involves a communication between the first DPE 602 and the fifth DPE 610.

In cases where it is not possible to assign related parts to directly-connected DPEs, such as in the one explained above, the first scheduler 220 may assign the parts to indirectly-connected DPEs. Even while performing such an assignment, the first scheduler 220 may attempt to keep the latency as less as possible. For instance, the first scheduler 220 may attempt to assign the third part 620 to a DPE that is connected to a DPE to which the first part 308 is assigned through a single intermediate DPE. Further, while performing such an assignment, the first scheduler 220 may reserve a portion, such as one tile, of the intermediate DPE that connects the two DPEs for transferring data between the two DPEs. For instance, referring to the above example, the first scheduler 220 may assign execution of the first part 308 to the first tile 612, execution of the second part 310 to the third tile 616, and execution of the third part 620 to the fourth tile 618. Further, the second tile 614, which is part of the fourth DPE 608 that connects the first DPE 602 and the fifth DPE 610, may be reserved for transferring output of execution of the third part 620 to the first DPE 602.

As explained above, the first scheduler 220 attempts to assign related parts to the same/neighboring DPEs and to assign the first and final parts to the same/neighboring DPEs and assigns accordingly if the attempts succeed. Thus, the scheduling according to the present subject matter achieves least possible latency in execution of a neural network in a clustered environment. Even if such a scheduling is not possible, by scheduling the parts to indirectly-connected DPEs and by reserving a portion of an intermediate DPE for communication of data between the indirectly-connected DPEs, the present subject matter ensures that execution of a neural network is achieved regardless of the cluster topology and regardless of DPE availability.

Figure 7:
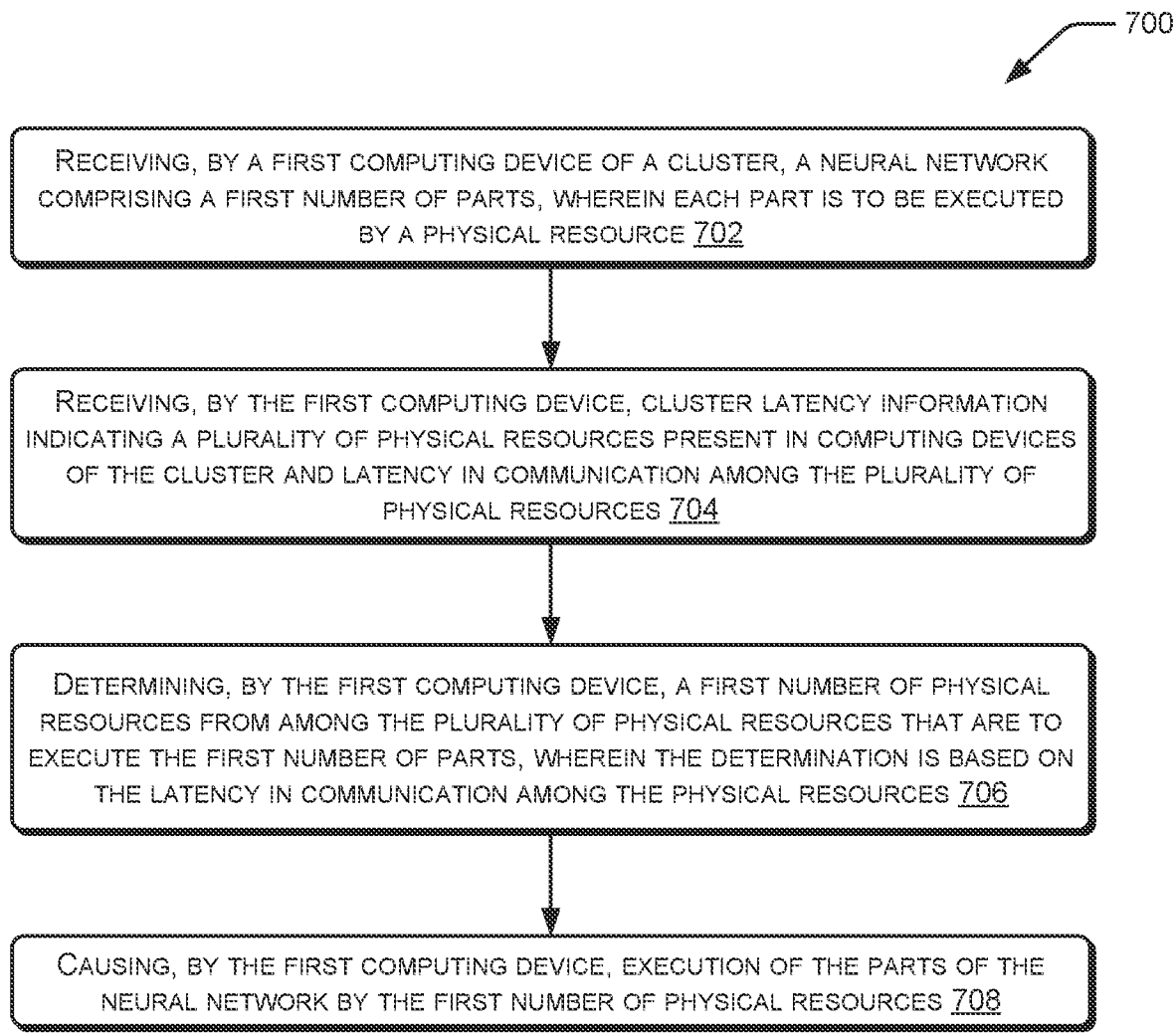
FIG. 7 illustrates a method for causing execution of neural networks, according to an example implementation of the present subject matter.
Figure 8:
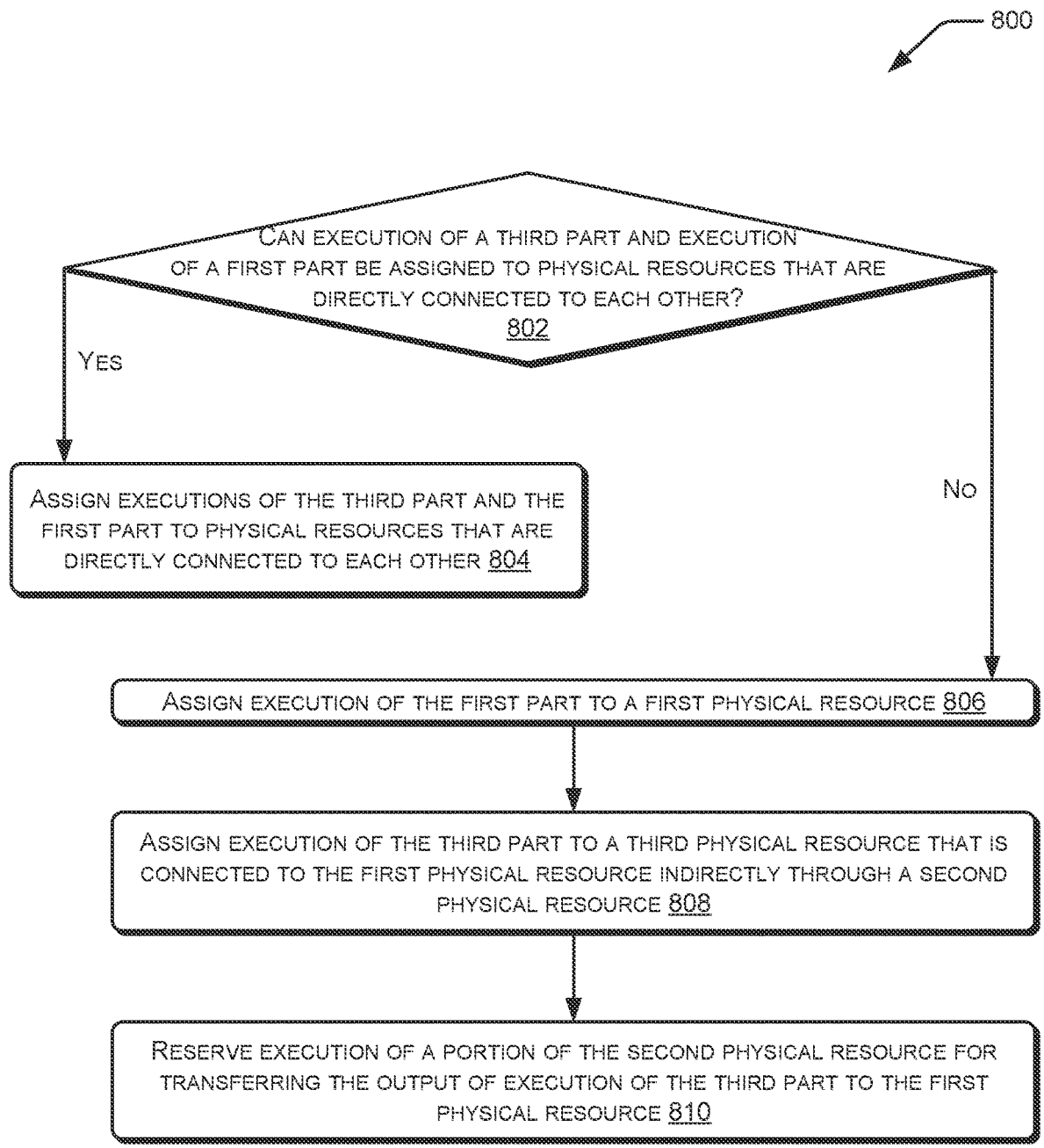
FIG. 8 illustrates a method for scheduling parts of a neural network to physical resources, according to an example implementation of the present subject matter.

FIGS. 7 and 8 illustrate methods 700 and 800, respectively, for causing execution of neural networks, according to example implementations of the present subject matter. The orders in which the methods 700 and 800 are described is not intended to be construed as a limitation, and any number of the described method blocks may be combined in any order to implement the methods 700 and 800, or alternative methods. Furthermore, the methods 700 and 800 may be implemented by processing resource(s) or computing device(s) through any suitable hardware, non-transitory machine-readable instructions, or a combination thereof.

It may be understood that blocks of the methods 700 and 800 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the methods 700 and 800 may be performed by a computing device, such as the computing device 100 or the first computing device 204. Although the methods 700 and 800 may be implemented in a variety of systems, the methods 700 and 800 are described in relation to the first computing device 204, for ease of explanation.

Referring to FIG. 7, at block 702, a neural network including a first number of parts may be received by a first computing device of a cluster. Each part is to be executed by a physical resource. The neural network may be, for example, the neural network 306, the first computing device may be the first computing device 204, and the duster may be the duster 202. Further, the physical resource may be, for example, a DPE.

At block 704, cluster latency information may be received. The cluster latency information may indicate a plurality of physical resources present in computing devices of the cluster and latency in communication among the plurality of physical resources. The cluster latency information may be, for example, the information included in a latency table, such as the latency table 500. Accordingly, the receipt of the cluster latency information may involve receiving the latency table.

At block 706, a first number of physical resources that are to execute the first number of parts may be determined. The first number of physical resources may be part of the plurality of physical resources. The determination of the first number of physical resources may be based on a latency in communication among the physical resources, as explained above. To determine the first number of physical resources based on the latency, the cluster latency information may be utilized.

In an example, the neural network may include a first part and a second part, such as the first part 308 and the second part 310 respectively. Further, an output from execution of the first part may have to be sent to the second part. In such a case, determining the first number of physical resources may include determining a physical resource that is to be selected for execution of the second part if a first physical resource is selected for execution of the first part, based on a latency in communication between the first physical resource and other physical resources of the plurality of physical resources. For instance, as explained above, a first physical resource may be tentatively selected for execution of the first part. In response to the tentative selection, a physical resource to which the second part is to be tentatively assigned may be determined based on latencies involved in communication of the other physical resources with the first physical resource.

In an example, as explained with reference to FIG. 6, the first computing device may attempt to assign both the first part and the second part to the same physical resource, as communication of output of the first part to the second part may be performed without a significant latency in that case. If such an attempt fails, the first computing device may attempt to assign the second part to a physical resource that is directly connected to the physical resource to which the first part is assigned. As explained above, a direct connection between two physical resources may refer to a connection that does not involve an intermediate physical resource, to facilitate communication of data between the two physical resources.

Further, in an example, an output from execution of a third part of the neural network is to be sent to a physical resource that is to execute a first part. The output from the third part may have to be utilized by the physical resource that is to execute the first part to generate an output of execution of the neural network. The first part may be, for example, the part that is to be executed at the beginning, such as before execution of the other parts. The third part may be, for example, a final part that is to be executed after execution of the remaining parts. The first part may be, for example, the first part 308 and the third part may be, for example, the third part 620. The physical resource that is to execute the third part may have to communicate the output of the third part to the physical resource that executes the first part. Accordingly, the method 700 may include determining a physical resource that is to be selected for execution of the third part if a first physical resource is selected for execution of the first part, based on a latency in communication between the first physical resource and a plurality of physical resources. For example, upon tentatively assigning execution of the first part to the first physical resource, the first computing device may determine if execution of the third part may also be assigned to the first physical resource. If that is not possible, such as due to tentative assignment of intermediate parts to the first physical resource, the first computing device may determine if execution of the third part may be assigned to a physical resource that is directly connected to the first physical resource.

At block 708, the first computing device may cause execution of the parts of the neural network by the first number of physical resources. To cause the execution, in an example, the first computing device may load the parts that are assigned to physical resources in the first computing device onto those physical resources. For instance, if the first part of the neural network is assigned to a first physical resource, such as the first physical resource 210, in the first computing device, the first computing device may load the first part onto the first physical resource. Further, the first computing device may transmit parts that are assigned to physical resources in other computing devices to those computing devices. For instance, if the second part of the neural network is assigned to a second physical resource, such as the second physical resource 212, in the second computing device, the first computing device may transmit the second part to the second physical resource. Subsequently, the second computing device may load the second part onto the second physical resource.

FIG. 8 illustrates a method 800 for scheduling parts of a neural network to physical resources, according to an example implementation of the present subject matter. As explained above, output from the third part of the neural network may have to be sent to the physical resource executing the first part to allow generation of an output of execution of the neural network. At block 802, it is determined whether execution of the third part and execution of the first part can be assigned to physical resources that are directly connected to each other. If yes, at block 804, the third part and the first part are assigned to physical resources that are directly connected to each other.

However, in some cases, such an assignment may not be possible. This may be, for example, because the number of parts in the neural network may be more than the number of available computation units in directly-connected physical resources, as exemplified in FIG. 6 and its corresponding description. In response to a determination that the execution of the third part and execution of the first part are not assignable to physical resources that are directly connected to each other, at block 806, the first part may be assigned to a first physical resource and, at block 808, the third part may be assigned to a third physical resource that is indirectly connected to the first physical resource. The third physical resource may be connected to the first physical resource indirectly through a second physical resource. The first physical resource, the second physical resource, and the third physical resource may be, for example, the first DPE 602, the fourth DPE 608, and the fifth DPE 610 respectively.

Further, at block 810, a portion of the second physical resource may be reserved for transferring the output of execution of the third part to the first physical resource. The portion may include, for example, a tile, such as the second tile 614.

Figure 9:
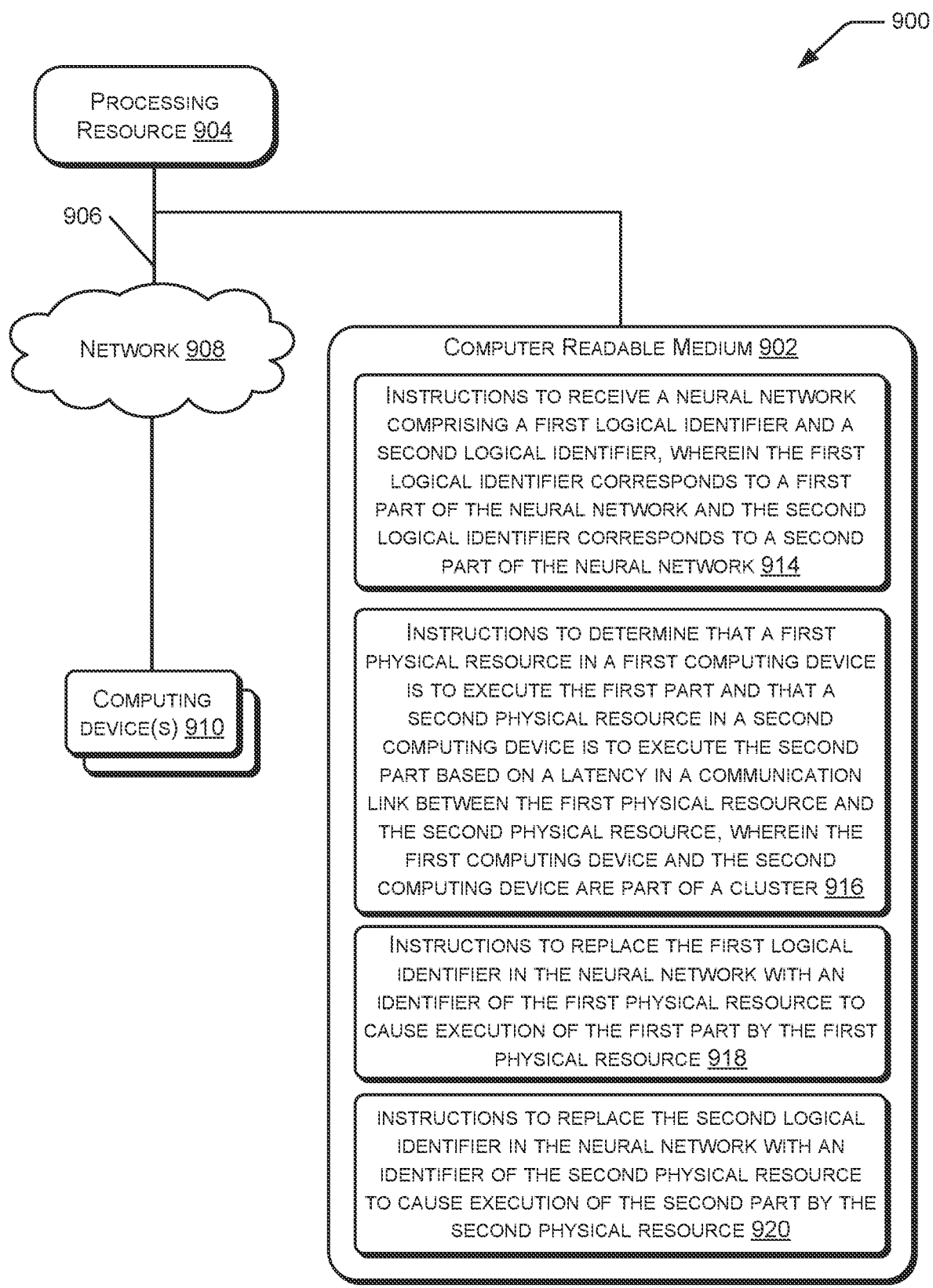
FIG. 9 illustrates a computing environment implementing a non-transitory computer-readable medium for causing execution of neural networks, according to an example implementation of the present subject matter.

FIG. 9 illustrates a computing environment 900 implementing a non-transitory computer-readable medium for causing execution of neural networks, according to an example implementation of the present subject matter. In an example, the non-transitory computer-readable medium 902 may be utilized by a computing device, such as the computing device 100 or the first computing device 204. In an example, the computing environment 900 may include a processing resource 904 communicatively coupled to the non-transitory computer-readable medium 902 through a communication link 906. The processing resource 904 may be, for example, the processor 102.

The non-transitory computer-readable medium 902 may be, for example, an internal memory device or an external memory device. In an example, the communication link 906 may be a direct communication link, such as any memory read/write interface. In another example, the communication link 906 may be an indirect communication link, such as a network interface. In such a case, the processing resource 904 may access the non-transitory computer-readable medium 902 through a network 908. The network 908 may be a single network or a combination of multiple networks and may use a variety of different communication protocols.

The processing resource 904 and the non-transitory computer-readable medium 902 may also be communicatively coupled to computing device(s) 910, which may be part of a cluster of computing devices, such as the cluster 202.

In an example implementation, the non-transitory computer-readable medium 902 includes a set of computer-readable instructions for causing execution of a neural network. The set of computer-readable instructions can be accessed by the processing resource 904 through the communication link 906 and subsequently executed.

Referring to FIG. 9, in an example, the non-transitory computer-readable medium 902 includes instructions 914 that cause the processing resource 904 to receive a neural network including a first logical identifier and a second logical identifier. The first logical identifier corresponds to a first part of the neural network and the second logical identifier corresponds to a second part of the neural network. The neural network, the first part, the second part, the first logical identifier, and the second logical identifier may be, for example, the neural network 306, the first part 308, the second part 310, the first logical identifier 328, and the second logical identifier 330 respectively.

In an example, each of the first part and the second part includes a set of neural network instructions, also referred to as a set of instructions. The set of instructions may include instructions to perform matrix-vector multiplications, instructions to perform vector-vector additions, instructions to perform loading of data, instructions to perform storing of data, instructions to perform sending of data, or a combination thereof. Each of the first part and the second part may be associated with weights, biases, or both.

The non-transitory computer-readable medium 902 may include instructions 916 that cause the processing resource 904 to determine that a first physical resource in a first computing device is to execute the first part and that a second physical resource in a second computing device is to execute the second part. Such a determination may be based on a latency in a communication link between the first physical resource and the second physical resource, as explained above. The first computing device and the second computing device may be part of a cluster, such as the cluster 202.

In an example, to determine the latency in communication between first physical resource and the second physical resource, cluster latency information may be utilized. The cluster latency information may indicate latency in communication between each physical resource in the cluster and remaining physical resources in the cluster. The cluster latency information may be, for example, the information included in the latency table 500. In an example, the cluster latency information may be generated by querying the second computing device for latency in communication between physical resources of the second computing device and by determining latency in communication between physical resources of the first computing device and physical resources of the second computing device.

In response to the determination by the instructions 916, instructions 918 of the non-transitory computer-readable medium 902 cause the processing resource 904 to replace the first logical identifier in the neural network with an identifier of the first physical resource to cause execution of the first part by the first physical resource. Further, instructions 920 of the non-transitory computer-readable medium 902 cause the processing resource 904 to replace the second logical identifier in the neural network with an identifier of the second physical resource to cause execution of the second part by the second physical resource.

In an example, each of the first part and the second part is executable by a tile of a physical resource. Further, the identifier of the first physical resource may be a first physical address of a first tile of the first physical resource, and the identifier of the second physical resource may be a second physical address of a second tile of the second physical resource. The first tile may be, for example, the first tile 612 and the second tile may be, for example, the third tile 616.

The present subject matter allows execution of a neural network in a cluster of computing devices, where each computing device has one or more physical resources for execution of neural network parts. Thus, the number of physical resources available for execution of a neural network increases. Accordingly, the present subject matter may prevent reprogramming or reduce the number of reprogramming of neural network data on physical resources (e.g., programming weight matrices on MVM units of DPEs), which may have to be performed if the number of physical resources available is less than the number of neural network parts. For example, using techniques of the present subject matter, weight matrices involved in execution of the neural network may remain programmed on the physical resources during the entire period of execution.

The present subject matter can be utilized for neural network execution in a computing environment in which the computing devices have a small number of physical resources. Thus, data is not to be transmitted from the computing environment to a cloud environment for execution of the neural networks, thereby eliminating consumption of network resources latency that would otherwise be involved in transmission of data to and from the cloud environment.

The present subject matter provides an efficient manner of scheduling neural network parts on the physical resources by considering data flow involved in the execution of the neural network and the latency involved communication of data among physical resources. Thus, execution of the neural network may be made faster.

The techniques of the present subject matter can be implemented in various types of cluster topologies, where physical resources are connected among them in a variety of configurations. Further, the manner in which the neural network model is compiled by the compiler may not have to be changed depending on the cluster topology. Thus, the compiler may be kept agnostic to the underlying cluster topology. Further, an application developer developing the neural network model is not to be aware of the cluster topology.

Although implementations of execution of neural networks have been described in language specific to structural features and/or methods, it is to be understood that the present subject matter is not necessarily limited to the specific features or methods described. Rather, the specific features and methods are disclosed and explained as example implementations.

We claim:

1. A computing device comprising:
a processor; and
a memory comprising instructions executable by the processor to:
receive a neural network to be executed by a plurality of hardware accelerators, the neural network comprises a first logical identifier corresponding to a first part and a second logical identifier corresponding to a second part, the first and second logical identifiers acting as placeholders for identifiers of hardware accelerators executing, respectively, the first and second parts of the neural network;
determine data-transfer latencies among the plurality of hardware accelerators based on speeds of communication links among the hardware accelerators;
identify first and second hardware accelerators having least data-transfer latency among the plurality of hardware accelerators, wherein the identified first and second hardware accelerators belong, respectively, to first and second computing devices, which are part of a cluster;
replace the first logical identifier in the neural network with an identifier of the identified first hardware accelerator;
replace the second logical identifier in the neural network with an identifier of the identified second hardware accelerator; and
execute the neural network, the first part being executed by the identified first hardware accelerator and the second part being executed by the identified second hardware accelerator.

2. The computing device of claim 1, wherein, to determine data-transfer latency between the first hardware accelerator and the second hardware accelerator, the instructions are executable by the processor to utilize cluster latency information that indicates data-transfer latency between each hardware accelerator in the cluster and remaining hardware accelerators in the cluster.

3. The computing device of claim 2, wherein the computing device is same as the first computing device, wherein the instructions are executable by the processor to generate the cluster latency information, and wherein, to generate the cluster latency information, the instructions are executable to:
query the second computing device for data-transfer latency between hardware accelerators within the second computing device; and
determine data-transfer latency between hardware accelerators within the first computing device and hardware accelerators within the second computing device.

4. The computing device of claim 2, wherein the instructions are executable by the processor to determine data-transfer latency between the first hard accelerator and another hardware accelerator in the first computing device.

5. The computing device of claim 2, wherein the instructions are executable by the processor to:

receive a request from a third computing device to join the cluster; and
update the cluster latency information with information of:
hardware accelerators in the third computing device;
data-transfer latency between the hardware accelerators in the third computing device; and
data-transfer latency between the first hardware accelerator and each hardware accelerator in the third computing device.

6. The computing device of claim 1, wherein each hardware accelerator is a dot-product engine (DPE) having a plurality of tiles.

7. The computing device of claim 6, comprising instructions executable to generate the neural network by compiling a neural network model, wherein, to generate the neural network, the instructions are executable to generate the first part and the second part such that each of the first part and the second part is executable by a tile of a DPE.

8. A method comprising:
receiving, by a first computing device of a cluster, a neural network comprising a first number of parts, wherein each part is to be executed by a hardware accelerator, and wherein each part includes a logical identifier acting as a placeholder for an identifier of a hardware accelerator executing the part;
receiving, by the first computing device, cluster latency information indicating a plurality of hardware accelerators present in computing devices of the cluster and data-transfer latencies among the plurality of hardware accelerators, the data-transfer latencies being determined based on speeds of communication links among the hardware accelerators;
identifying, by the first computing device, a first number of hardware accelerators with least data-transfer latencies among them from the plurality of hardware accelerators;
replacing logical identifiers in the first number of parts with identifiers associated with the identified first number of hardware accelerators; and
executing the first number of parts of the neural network by the first number of hardware accelerator.

9. The method of claim 8, wherein an output from execution of a first part of the neural network is to be sent to a second part of the neural network and wherein determining the first number of hardware accelerators comprises:
determining a hardware accelerator that is to be selected for execution of the second part if a first hardware accelerator is selected for execution of the first part, based on data-transfer latency between the first hardware accelerator and other hardware accelerators of the plurality of hardware accelerators.

10. The method of claim 8, wherein an output from execution of a third part of the neural network is to be sent to a hardware accelerator that is to execute a first part of the neural network, to cause the hardware accelerator that is to execute the first part to generate an output of execution of the neural network, and wherein determining the first number of hardware accelerators comprises:
determining a hardware accelerator that is to be selected for execution of the third part if a first hardware accelerator is selected for execution of the first part based on data-transfer latency in between the first hardware accelerator and a plurality of hardware accelerators.

11. The method of claim 10, wherein determining the first number of hardware accelerators comprises:

determining whether execution of the third part and execution of the first part are assignable to hardware accelerators that are directly connected to each other;

in response to a determination that the execution of the third part and execution of the first part are not assignable to hardware accelerators that are directly connected to each other, determining the first number of hardware accelerators comprises:

determining that execution of the first part is to be assigned to a first hardware accelerator;

determining that execution of the third part is to be assigned to a third hardware accelerator, wherein the third hardware accelerator is connected to the first hardware accelerator indirectly through a second hardware accelerator; and reserving a portion of the second hardware accelerator for transferring the output of execution of the third part to the first hardware accelerator.

12. The method of claim 11, wherein the second hardware accelerator is a dot-product engine (DPE) and wherein the portion of the second hardware accelerator reserved comprises a tile of the DPE.

13. The method of claim 8, wherein the first number of hardware accelerators comprises a first hardware accelerator in the first computing device and wherein executing the first number of parts comprises:

loading, by the first computing device, a first part of the neural network onto the first hardware accelerator; and transmitting, by the first computing device, a second part of the neural network to a second computing device for loading of the second part onto a second hardware accelerator of the second computing device.

14. The method of claim 13, comprising loading, by the second computing device, the second part of the neural network onto the second hardware accelerator.

15. A non-transitory computer-readable medium comprising instructions, the instructions being executable by a processing resource to:

receive a neural network comprising a first logical identifier and a second logical identifier, wherein the first logical identifier corresponds to a first part of the neural network and the second logical identifier corresponds to a second part of the neural network, and wherein the first and second logical identifiers act as placeholders for identifiers of hardware accelerators executing, respectively, the first and second parts of the neural network;

determine data-transfer latencies among a plurality of hardware accelerators based on speeds of communication links among the hardware accelerators;

identify first and second hardware accelerators having least data-transfer latency among the plurality of hardware accelerators, wherein the identified first and second hardware accelerators belong, respectively, to the first and second computing devices, which are part of a cluster;

replace the first logical identifier in the neural network with an identifier of the identified first hardware accelerator;

replace the second logical identifier in the neural network with an identifier of the identified second hardware accelerator; and execute the neural network, the first part being executed by the identified first hardware accelerator and the second part being executed by the identified second hardware accelerator.

16. The non-transitory computer-readable medium of claim 15, wherein, to determine data-transfer latency between first hardware accelerator and the second hardware accelerator, the instructions executable by the processing resource to utilize cluster latency information that indicates data-transfer latency between each hardware accelerator in the cluster and remaining hardware accelerators in the cluster.

17. The non-transitory computer-readable medium of claim 16, wherein the instructions are executable by the processing resource to generate the cluster latency information by:

querying the second computing device for data-transfer latency between hardware accelerators of the second computing device; and determining data-transfer latency between hardware accelerators of the first computing device and hardware accelerators of the second computing device.

18. The non-transitory computer-readable medium of claim 15, wherein each of the first part and the second part comprises a set of neural network instructions, the set of neural network instructions comprising instructions to perform one or more of: matrix-vector multiplications, vector-vector additions, loading of data, storing of data, and sending of data, and wherein each of the first part and the second part is associated with one or more of: weights and biases.

19. The non-transitory computer-readable medium of claim 15, wherein each hardware accelerator is a dot-product engine (DPE) having a plurality of tiles, wherein each of the first part and the second part is executable by a tile of a DPE, wherein the identifier of the first hardware accelerator is a first physical address of a first tile, and wherein the identifier of the second hardware accelerator is a second physical address of a second tile.

* * * * *